United States Patent Office 2,958,689
Patented Nov. 1, 1960

2,958,689

METALLIZABLE HEXAKISAZO DYESTUFFS

Hans-Rudolf Byland, Riehen, and Fritz Kehrer, Basel, Switzerland, assignors to Sandoz A. G., Basel, Switzerland No Drawing. Filed Aug. 8, 1958, Ser. No. 753,869

Claims priority, application Switzerland July 1, 1954

6 Claims. (Cl. 260—144)

The present application is a continuation-in-part application to our co-pending application Ser. No. 518,399, filed on June 27, 1955, now abandoned. The present invention relates to new metallizable hexakisazo dyestuffs of the formula

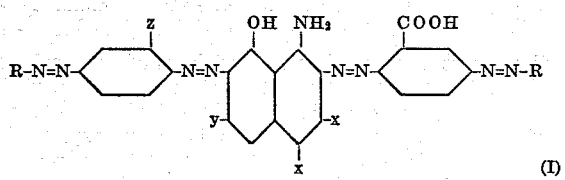

(I)

wherein one $x$ represents hydrogen, the other $x$ being a sulfonic acid group, $y$ represents hydrogen or a sulfonic acid group, $z$ represents —COOH or —OCH$_3$, and R represents the radical of a monoazo compound which corresponds to the following formula and couples in the position of the naphthalene nucleus designated by an arrow (→)

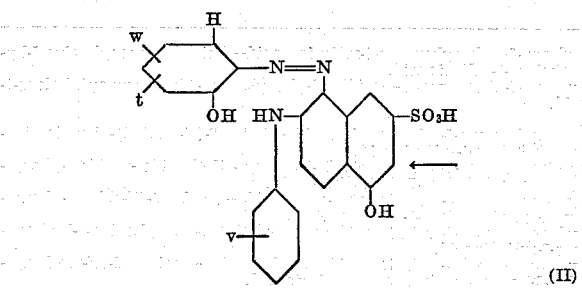

(II)

wherein $v$ represents hydrogen, methyl, methoxy, chlorine or a sulfonic acid group, $w$ represents hydrogen, chlorine, nitro, a sulfonic acid group, a sulfonic acid amide group, a sulfonic acid lower alkylamide group, a sulfonic acid lower hydroxyalkylamide group, a sulfonic acid-di-(lower alkyl)-amide group, a sulfonic acid-di-(lower hydroxyalkyl)-amide group or a methylsulfonyl group, $t$ represents hydrogen, chlorine, nitro, a sulfonic acid or a carboxylic acid group, when $w$ stands for hydrogen, chlorine, nitro or a sulfonic acid group, $t$ and $w$ being different from each other, except when both stand for hydrogen, and the carboxylic acid group represented by $t$ standing in ortho-position to the hydroxy group, and represents only hydrogen, when $w$ has a meaning other than hydrogen, chlorine, nitro and a sulfonic acid group, the total number of sulfonic acid groups present in the hexakisazo dyestuff being at most 6.

These new hexakisazo dyestuffs are obtained when 1 mole of a disazo compound of the formula

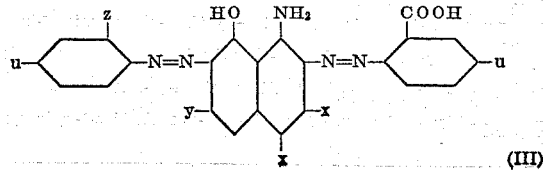

(III)

wherein $x$, $y$ and $z$ possess the above named meanings, one $u$ represents an amino group and the other $u$ represents an amino group, a nitro group or a readily saponifiable acylamino group, (a) is tetrazotized (provided the two substituents $u$ are amino groups) and the resulting tetrazo compound is coupled with two moles of a monoazo compound of the formula II; (b) is diazotized (provided one of the substituents $u$ is a nitro or a readily saponifiable acylamino group), the diazo compound is combined with 1 mole of a monoazo compound of the Formula II and the nitro or saponifiable acylamino group in the resulting tetrakisazo compound reduced or saponified, as the case may be, to the amino group, this being diazotized and the diazotetrakisazo compound thus obtained coupled with 1 mole of the same monoazo compound of the Formula II.

The reduction of the nitro to the amino group, where present as substituent $u$, is carried out by the agency of e.g. sodium sulfhydrate, the saponification of the alternative acylamino group being effected in an acid or alkaline medium. Readily saponifiable acylamino groups are, for example, the formyl, acetyl, oxalyl, carbomethoxy- and carboethoxy-amino groups.

The monoazo compounds of the Formula II are produced by coupling diazotized 2-amino-1-hydroxybenzenes in an acid medium with 2-phenylamino-5-hydroxynaphthalene-7-sulfonic acids which may be substituted in the phenyl radical by methyl, methoxy, chlorine or a sulfonic acid group.

Examples of 2-amino-1-hydroxybenzenes suitable for this purpose are: 2-amino-1-hydroxybenzene, 2-amino-1-hydroxy-4-nitro-6-carboxybenzene, 2-amino-1-hydroxy-4- or -5-alkylsulfonyl-benzenes, 2-amino-1-hydroxybenzene-4- or -5-sulfonic acid, 2-amino-1-hydroxy-6-carboxybenzene-4-sulfonic acid, 2-amino-1-hydroxybenzene-4- or -5-sulfonic acid amide and the derivatives methylated, ethylated, dimethylated and diethylated on the nitrogen atom of the sulfamide group, also 2-amino-1-hydroxy-4-chloro- or -nitrobenzene-5-sulfonic acid, 2-amino-1-hydroxy-6-nitro- or -chlorobenzene-4-sulfonic acid and the isomeric compounds in which the substituents in 4- and 6-position are replaced by each other, further the 2-amino-1-hydroxy-5-nitrobenzene, 2-amino-1-hydroxy-4-nitro- or -chlorobenzene and 2-amino-1-hydroxy-4-chloro-5- or -6-nitrobenzene.

When the two substituents $u$ in the Formula III are amino groups, the tetrazo compound obtained by treating the diamine with sodium nitrite in acid medium is coupled with 2 moles of a monoazo compound of the Formula II in an alkaline medium. To accelerate the coupling reaction it is advisable to include an organic tertiary base such as pyridine, quinoline or a technical mixture of pyridine bases in the reacting solution.

When however one of the substituents $u$ in the Formula III is an amino group and the other is a nitro group or a readily saponifiable acylamino group, the diazo compound obtained by treating the monoamine with sodium nitrite in acid medium is coupled with 1 mole of the monoazo compound of the Formula II, then the nitro group is reduced or the acylamino group is split off, the amino group thus obtained is diazotized and the diazotetrakisazo compound is coupled with 1 mole of the same monoazo compound of the Formula II. An addition of an organic tertiary base such as pyridine, quinoline or a technical mixture of pyridine bases to the second coupling solution causes a considerable acceleration of the coupling reaction.

The new hexakisazo dyestuffs are readily soluble in water and possess excellent building-up properties on cotton and fibers made from regenerated cellulose and a good salt controlability. They dye these fibers by the one-bath coppering and two-bath aftercoppering processes in superior gray shades of excellent fastness to light, washing, perspiration, formaldehyde and gas fumes. The dyeings are well dischargeable and possess a good stability to anticrease finishing treatments and a good fastness to boiling in alkaline and neutral medium either in open or in closed vessels. Aftertreatment of the dyeings with salts of divalent copper in the presence of polymeric substances containing imino or amino groups, such as are described for example in U.S. Patent 2,622,075, is particularly valuable.

The following examples illustrate the invention. All parts are by weight; temperatures are in degrees centigrade.

*Example 1*

6.3 parts of the diaminodisazo compound of the formula

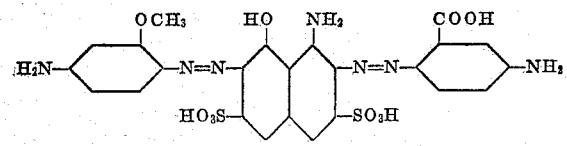

are dissolved in 80 parts of water and 2 parts of sodium carbonate. 1.4 parts of sodium nitrite are added to the solution which is then dropped slowly into a mixture of 15 parts of concentrated hydrochloric acid and 50 parts of ice. The tetrazo compound thus formed is transferred dropwise in the course of one hour to an ice-cooled solution of 10.8 parts of the monoazo compound obtained by acid coupling of diazotized 2-amino-1-hydroxybenzene-4-sulfonic acid amide with 2-phenylamino-5-hydroxynaphthalene-7-sulfonic acid, 150 parts of water, 10 parts of a mixture of pyridine bases and 70 parts of aqueous ammonia. The hexakisazo dyestuff is rapidly formed. After being agitated for several hours, the coupling mass is heated, the dyestuff precipitated by means of common salt, filtered and dried. It is a dark powder which dissolves in water to give solutions of blue-green colour from which cotton and fibers from regenerated cellulose are dyed in neutral gray shades. Aftertreatment with copper salts imparts to the dyeings outstanding fastness to washing and perspiration and very good fastness to light.

*Example 2*

6.6 parts of the nitro-aminodisazo compound of the formula

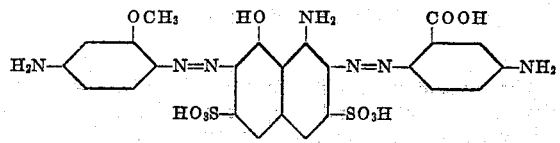

are dissolved in 50 parts of water and 2 parts of sodium carbonate. To this 0.7 part of sodium nitrite is added and the solution dropped slowly into a mixture of 10 parts of hydrochloric acid and 50 parts of ice. The diazodisazo compound so formed is run into a solution of 5.2 parts of the monoazo compound obtained by acid coupling of diazotized 2-amino-1-hydroxy-4-methylsulfonylbenzene with 2-phenylamino-5-hydroxynaphthalene-7-sulfonic acid, 150 parts of water, 10 parts of a mixture of pyridine bases and 50 parts of aqueous ammonia. The nitrotetrakisazo compound thus obtained is converted into the aminotetrakisazo compound by

TABLE

| Example No. | (I) 1-Amino-8-hydroxynaphthalenesulfonic acid | (II) z | (III) Monoazo Compound RH |
|---|---|---|---|
| 3 | 1-amino-8-hydroxynaphthalene-3.6-disulfonic acid | —OCH₃ | 2-amino-1-hydroxy-6-carboxybenzene-4-sulfonic acid→(acid) 2-phenylamino-5-hydroxynaphthalene-7-sulfonic acid. |
| 4 | do | —OCH₃ | 2-amino-1-hydroxy-4-nitrobenzene→(acid) 2-phenylamino-5-hydroxynaphthalene-7-sulfonic acid. |
| 5 | do | —COOH | Do. |
| 6 | 1-amino-8-hydroxynaphthalene-4.6-disulfonic acid | —COOH | 2-amino-1-hydroxybenzene-5-sulfonic acid amide→(acid) 2-(4'-methyl)-phenylamino-5-hydroxynaphthalene-7-sulfonic acid. |
| 7 | 1-amino-8-hydroxynaphthalene-4-sulfonic acid | —OCH₃ | 2-amino-1-hydroxybenzene-4-sulfonic acid-(2'-hydroxy)-ethylamide→(acid) 2-phenylamino-5-hydroxynaphthalene-7.4'-disulfonic acid. |
| 8 | 1-amino-8-hydroxynaphthalene-3.6-disulfonic acid | —OCH₃ | 2-amino-1-hydroxybenzene-4-sulfonic acid-ethylamide→(acid) 2-(2'-chloro)-phenylamino-5-hydroxynaphthalene-7-sulfonic acid. |
| 9 | do | —COOH | 2-amino-1-hydroxybenzene-4-sulfonic acid amide→(acid) 2-phenylamino-5-hydroxynaphthalene-7-sulfonic acid. |
| 10 | do | —COOH | 2-amino-1-hydroxybenzene-4-sulfonic acid methylamide→(acid) 2-(4'-methoxy)-phenylamino-5-hydroxynaphthalene-7-sulfonic acid. |
| 11 | do | —COOH | 2-amino-1hydroxy-4nitro-6-chlorobenzene→(acid) 2-(4'-chloro)-phenylamino-5-hydroxynaphthalene-7-sulfonic acid. |
| 12 | 1-amino-8-hydroxynaphthalene-4-sulfonic acid | —OCH₃ | 2-amino-1-hydroxy-4-chlorobenzene→(acid) 2-phenylamino-5-hydroxynaphthalene-7.4'-disulfonic acid. |
| 13 | do | —OCH₃ | 2-amino-1-hydroxybenzene-4-sulfonic acid butylamide→(acid) 2-phenylamino-5-hydroxynaphthalene-7.3'-disulfonic acid. |
| 14 | do | —OCH₃ | 2-amino-1-hydroxybenzene-5-sulfonic acid→(acid) 2-(2'-methyl)-phenylamino-5-hydroxynaphthalene-7-sulfonic acid. |
| 15 | 1-amino-8-hydroxynaphthalene-4.6-disulfonic acid | —COOH | 2-amino-1-hydroxy-4-chlorobenzene-5-sulfonic acid→(acid) 2-(3'-chloro)-phenylamino-5-hydroxynaphthalene-7-sulfonic acid. |
| 16 | 1-amino-8-hydroxynaphthalene-3.6-disulfonic acid | —COOH | 2-amino-1-hydroxy-4-chloro-6-nitrobenzene→(acid) 2-(2'-methoxy)-phenylamino-5-hydroxynaphthalene-7-sulfonic acid. |
| 17 | do | —COOH | 2-amino-1-hydroxybenzene-4-sulfonic acid-(2'-hydroxy)-propylamide→(acid) 2-(3'-methyl)-phenylamino-5-hydroxynaphthalene-7-sulfonic acid. |
| 18 | do | —COOH | 2-amino-1-hydroxy-4-nitrobenzene-6-sulfonic acid→(acid) 2-(4'-chloro)-phenylamino-5-hydroxynaphthalene-7-sulfonic acid. |
| 19 | do | —COOH | 2-amino-1-hydroxybenzene→(acid) 2-phenylamino-5-hydroxynaphthalene-7-sulfonic acid. |
| 20 | do | —OCH₃ | 2-amino-1-hydroxy-4-nitro-6-carboxybenzene→(acid) 2-phenylamino-5-hydroxynaphthalene-7-sulfonic acid. |
| 21 | do | —COOH | 2-amino-1-hydroxy-4-nitro-6-carboxybenzene→(acid) 2-(4'-methyl)-phenylamino-5-hydroxynaphthalene-7-sulfonic acid. |
| 22 | do | —OCH₃ | 2-amino-1-hydroxybenzene-4-sulfonic acid-di-(methyl)-amide→(acid) 2-phenylamino-5-hydroxynaphthalene-7.4'-disulfonic acid. |
| 23 | do | —COOH | 2-amino-1-hydroxybenzene-5-sulfonic acid-di-(2'-hydroxyethyl)-amide→(acid) 2-phenylamino-5-hydroxynaphthalene-7-sulfonic acid. |
| 24 | 1-amino-8-hydroxynaphthalene-4-sulfonic acid | —COOH | 2-amino-1-hydroxybenzene-4-sulfonic acid-diethylamide→(acid) 2-phenylamino-5-hydroxynaphthalene-7.3'-disulfonic acid. |
| 25 | do | —COOH | 2-amino-1-hydroxy-4-methylsulfonylbenzene→(acid) 2-phenylamino-5-hydroxynaphthalene-7-sulfonic acid. |
| 26 | do | —COOH | 2-amino-1-hydroxybenzene-4-sulfonic acid amide→(acid) 2-phenylamino-5-hydroxynaphthalene-7-sulfonic acid. |
| 27 | 1-amino-8-hydroxynaphthalene-4.6-disulfonic acid | —COOH | 2-amino-1-hydroxy-5-nitrobenzene→(acid) 2-phenylamino-5-hydroxynaphthalene-7-sulfonic acid. |
| 28 | do | —OCH₃ | 2-amino-1-hydroxy-6-nitrobenzene-4-sulfonic acid→(acid) 2-(4'-methyl)-phenylamino-5-hydroxynaphthalene-7-sulfonic acid. |
| 29 | do | —COOH | 2-amino-1-hydroxy-4-chloro-5-nitrobenzene→(acid) 2-phenylamino-5-hydroxynaphthalene-7-sulfonic acid. | adding a solution of 2.5 parts of sodium sulfide in 12.5 parts of water at 60°. To the solution is then given 0.7 part of sodium nitrite and it is transferred dropwise to a mixture of 20 parts of hydrochloric acid and 100 parts of ice. The mixture containing the resulting diazotetrakisazo compound is added to a solution at 10° of 5.2 parts of the monoazo compound obtained by acid coupling of diazotized 2-amino-1-hydroxy-4-methylsulfonylbenzene with 2-phenylamino-5-hydroxynaphthalene-7-sulfonic acid, 100 parts of water, 10 parts of 30% sodium hydroxide solution and 25 parts of a mixture of pyridine bases. After some time the hexakisazo dyestuff so formed is completely precipitated from the coupling mass by means of common salt, then filtered and if necessary purified. It is a dark powder which dyes cotton and fibers from regenerated cellulose by the one-bath coppering and two-bath aftercoppering processes in gray shades of very good fastness to light, washing and perspiration.

Further polyazo dyestuffs obtainable by the process described in Examples 1 and 2 are tabulated above.
The dyestuffs correspond to the general formula:

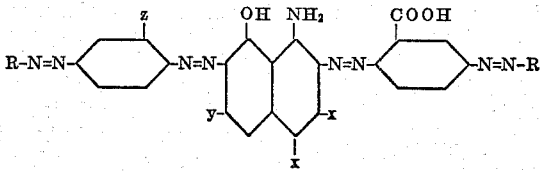

and are characterized by the 1-amino-8-hydroxynaphthalenesulfonic acid used (Column I), the substituent $z$ (Column II) and the monoazo compound (R—H) from which the radical R is derived (Column III). The aftercoppered dyeings of the new hexakisazo dyestuffs are all gray in shade.

The following are formulae of representative products of the foregoing examples.

*Example 1*

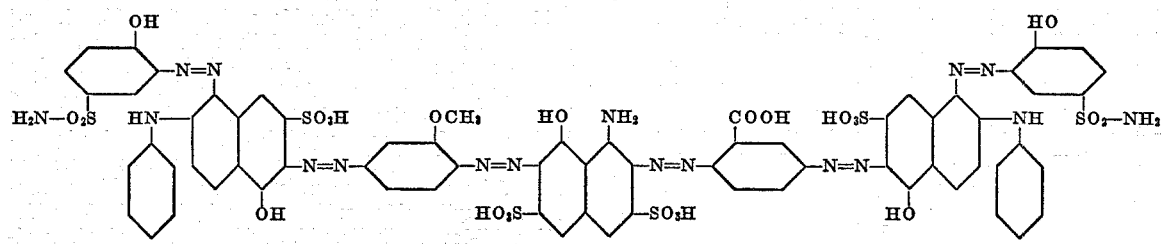

*Example 2*

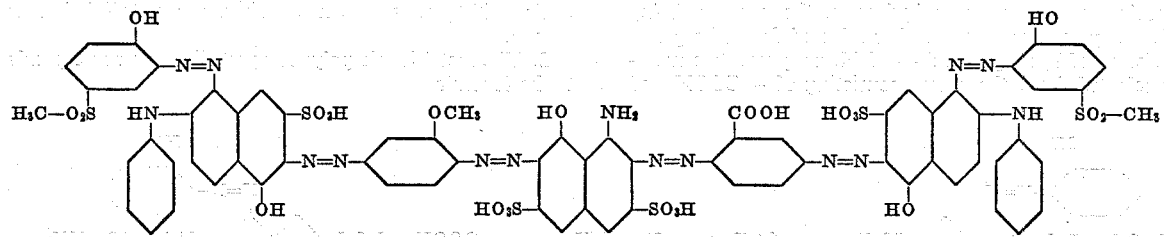

*Example 4*

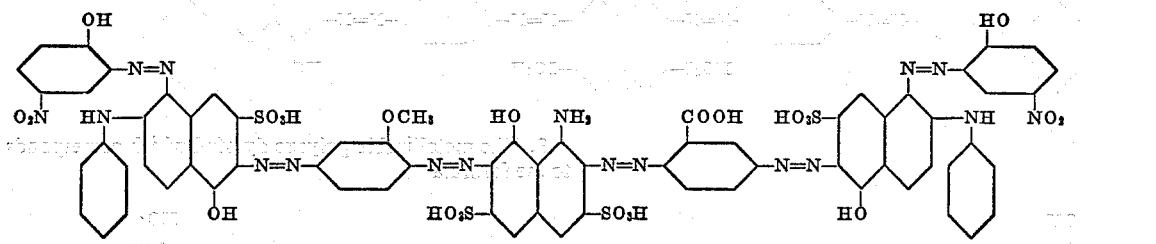

*Example 5*

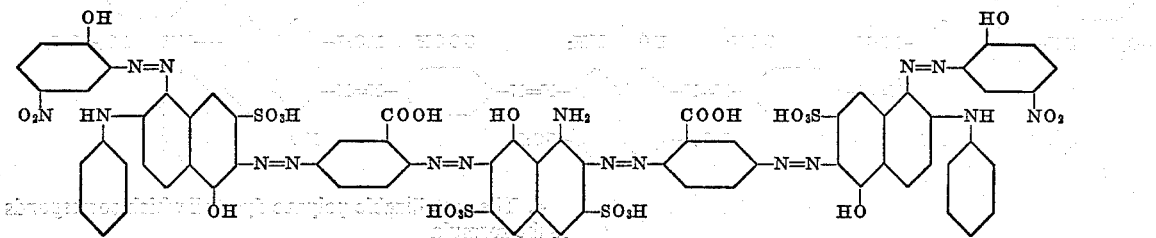

*Example 9*

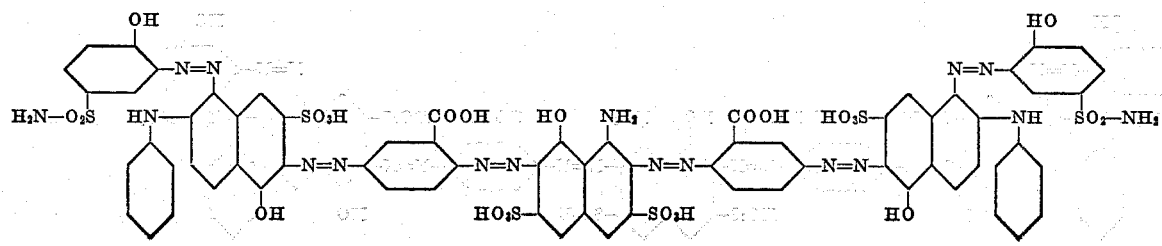

Example 30

10 parts of pre-wetted cotton are entered into 300 parts of water at 40°. The bath is then prepared with a concentrated aqueous solution of 0.2 part of the dyestuff obtained according to Example 1 and raised to the boil in 30 minutes. During this time 3 parts of sodium sulfate in the form of a concentrated aqueous solution are added to the dyebath in small portions. The dyebath is maintained at the boil for a further 30 minutes, when 1 part of sodium sulfate is added; it is then cooled slowly to 40°. The dyed material is rinsed well and then treated for 30 minutes in a fresh bath at 70° containing 300 parts of water, 0.3 part of acetic acid and 0.2 part of copper sulfate. The dyeing, thus metallized, is finally rinsed and dried.

In place of the 0.2 part of copper sulfate in the after-treating bath, 0.2 part of a copper complex compound of the condensation product of diethylene triamine and dicyanodiamide can be used.

Having thus disclosed the invention what we claim is:

1. A metallizable hexakisazo dyestuff of the formula

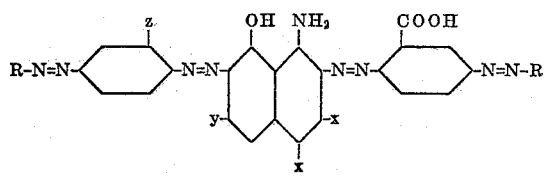

wherein one $x$ represents hydrogen, the other $x$ being —$SO_3H$, $y$ represents a member selected from the group consisting of hydrogen and —$SO_3H$, $z$ represents a member selected from the group consisting of —COOH and —$OCH_3$, and R is the radical of a monoazo compound which corresponds to the formula

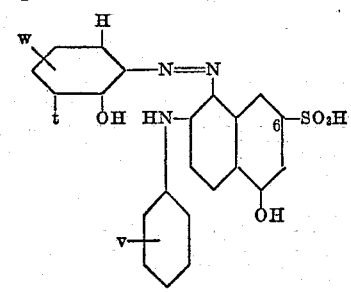

which couples in the position 6 of the naphthalene nucleus, and wherein $v$ represents a member selected from the group consisting of hydrogen, methyl, methoxy, chlorine and —$SO_3H$, $w$ represents a member selected from the group consisting of hydrogen, chlorine, nitro, —$SO_3H$, sulfonamido, sulfon(lower alkyl)amido, sulfon(lower hydroxyalkyl)amido, sulfon(di-lower alkyl)amido, sulfon(di-lower hydroxyalkyl)amido and methylsulfonyl, and $t$ represents a member selected from the group consisting of hydrogen, chlorine, nitro, —$SO_3H$ and —COOH when $w$ stands for a member selected from the group consisting of chlorine, nitro and —$SO_3H$, $t$ and $w$ being different from each other except when both stand for hydrogen, and $t$ being hydrogen when $w$ represents a member selected from the group consisting of sulfonamido, sulfon(lower alkyl)amido, sulfon(lower hydroxyalkyl)amido, sulfon (di-lower alkyl)amido, sulfon(di-lower hydroxyalkyl)amido and methylsulfonyl, the total number of sulfonic acid groups in the hexakisazo dyestuff being at most 6.

2. The metallizable polyazo dyestuff which corresponds to the formula

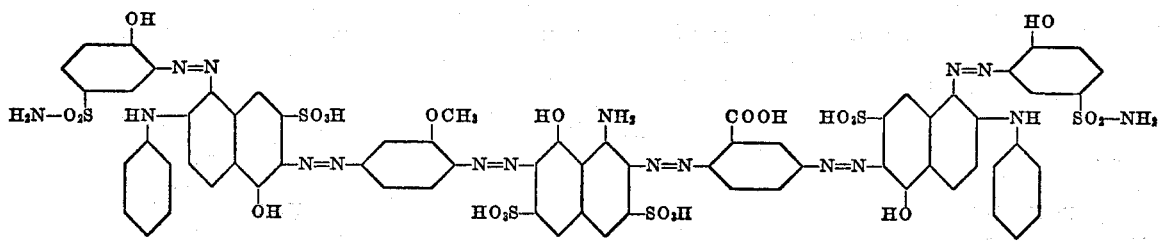

3. The metallizable polyazo dyestuff which corresponds to the formula

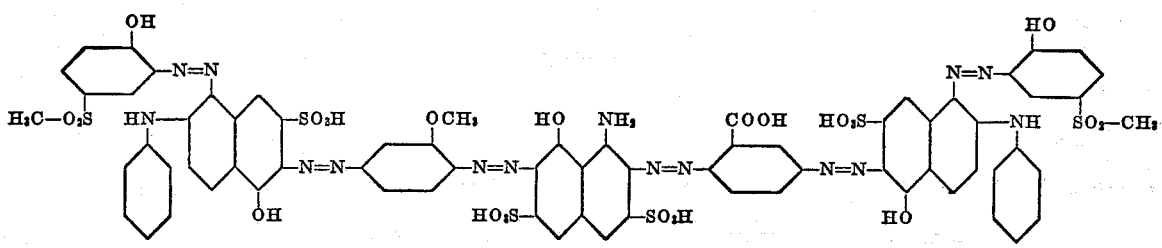

4. The metallizable polyazo dyestuff which corresponds to the formula

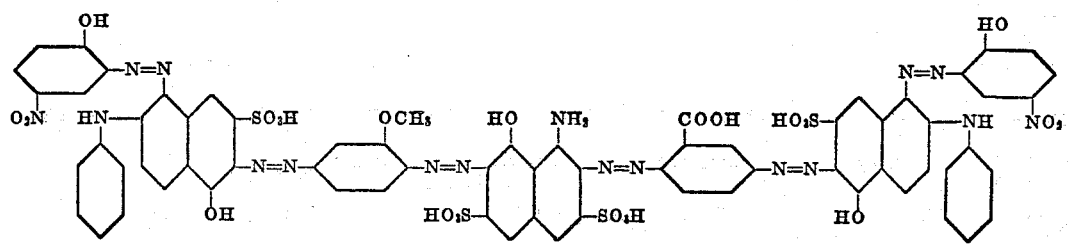

5. The metallizable polyazo dyestuff which corresponds to the formula
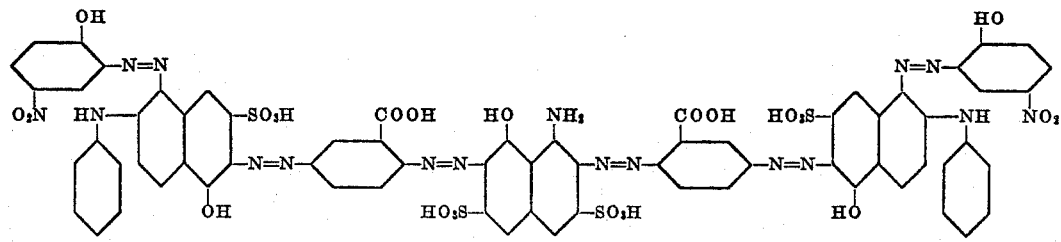
6. The metallizable polyazo dyestuff which corresponds to the formula
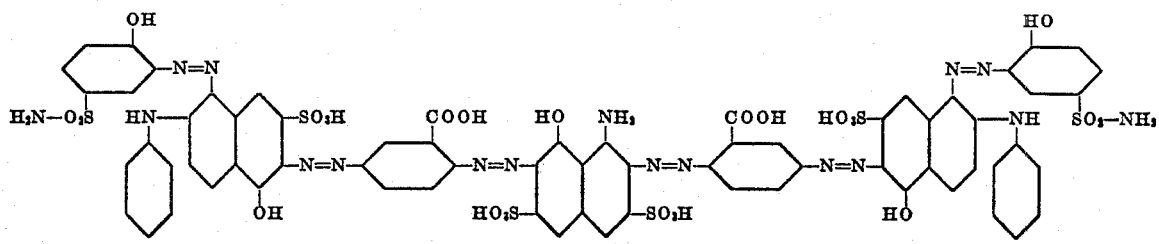
References Cited in the file of this patent
UNITED STATES PATENTS
| | | |
|---|---|---|
| 2,488,076 | Bossard | Nov. 15, 1949 |
| 2,507,754 | Bossard et al. | May 16, 1950 |

UNITED STATES PATENT OFFICE
CERTIFICATION OF CORRECTION

Patent No. 2,958,689　　　　　　　　　　　　　November 1, 1960

Hans-Rudolf Byland et al.

It is hereby certified that error appears in the above numbered patent requiring correction and that the said Letters Patent should read as corrected below.

Column 4, lines 15 to 19, the left-hand portion of the formula should appear as shown below instead of as in the patent:

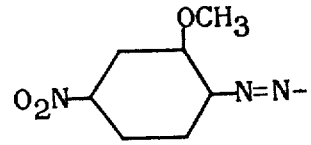

column 8, lines 5 to 12, the right-hand portion of the formula should appear as shown below instead of as in the patent:

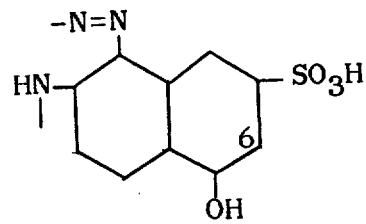

Signed and sealed this 8th day of August 1961.

(SEAL)
Attest:

ERNEST W. SWIDER
Attesting Officer

DAVID L. LADD
Commissioner of Patents